C. L. PEARSON.
MOTOR SUSPENSION.
APPLICATION FILED APR. 22, 1918.
1,373,093.
Patented Mar. 29, 1921.
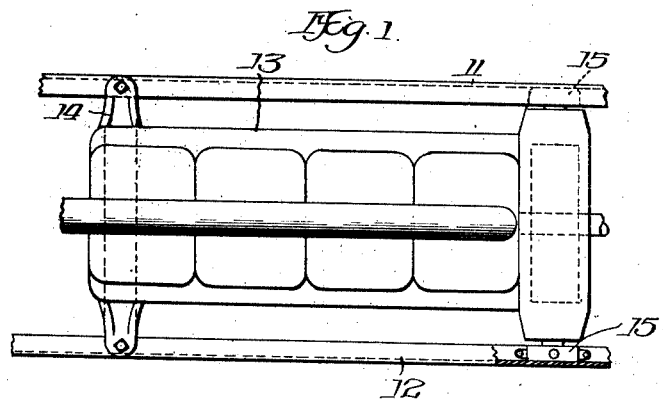
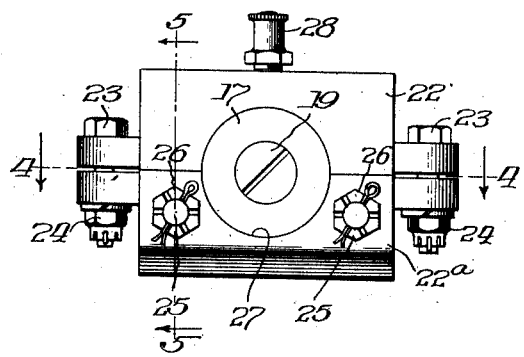
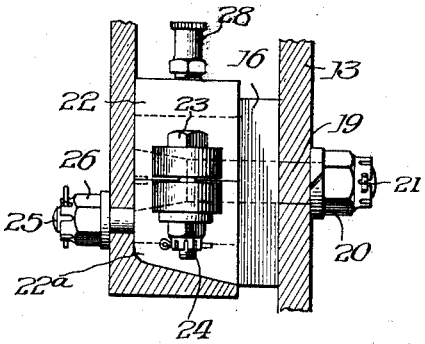
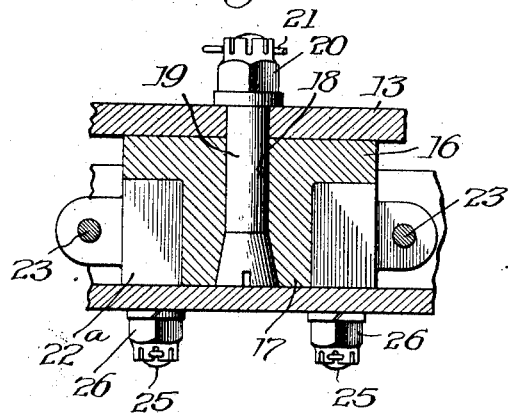
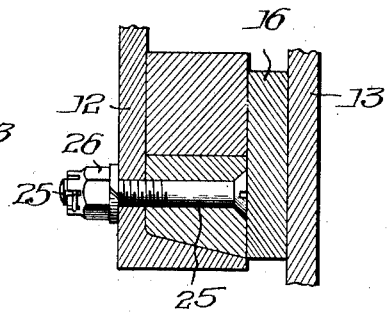
Witness:
Geo. C. Davison
Inventor
Carl L. Pearson,
By Cromwell, Greist & Warden
Attys.

UNITED STATES PATENT OFFICE.

CARL L. PEARSON, OF CHICAGO, ILLINOIS, ASSIGNOR TO SANDOW MOTOR TRUCK COMPANY, OF CHICAGO, ILLINOIS, A CORPORATION OF MAINE.

MOTOR SUSPENSION.

1,373,093.  Specification of Letters Patent.  Patented Mar. 29, 1921.

Application filed April 22, 1918. Serial No. 230,069.

*To all whom it may concern:*

Be it known that I, CARL L. PEARSON, a citizen of the United States, residing at Chicago, in the county of Cook and State of Illinois, have invented certain new and useful Improvements in Motor Suspension, of which the following is a specification.

In heavy car construction, particularly motor trucks, it is found that the torsional strains incident to traffic are injuriously manifested in relative movement between the truck frame and points of motor support, resulting in broken motor legs and disturbance of adjustment.

The present invention has for its prime object the suspension of the motor from the frame in such manner as to insulate the motor from all such strains and thus to obviate all resultant injuries and disadvantages incident to motor suspension heretofore common.

Concomitant advantages of the present construction are cheapness of installation and maintenance, ease of mounting and dismounting the motor, saving of repairs and renewals, increase of motor efficiency due to permanency of adjustment, and many others which will be apparent to those skilled in the construction and operation of motor trucks.

In order that the invention may be readily understood, a preferred embodiment of the same is set forth in the accompanying drawings and in the following detailed description predicated thereon. Obviously many changes in constructional design will suggest themselves, which embody the spirit of the present invention; wherefore it is to be understood that the specification and drawing are to be taken in an illustrative rather than in an unnecessarily limiting sense. In the drawings—

Figure 1 is a fragmentary plan view diagrammatically showing the relation of the motor to the truck frame and the relation of both to the motor suspension embodying the present invention;

Fig. 2 is a side elevation of the elements comprising the motor suspension as disassociated from the truck frame and motor;

Fig. 3 is a fragmentary vertical section through the truck frame and motor frame showing the relation of the motor suspension to each;

Fig. 4 is a section through the motor suspension elements taken on the line 4—4 of Fig. 2; and Fig. 5 is a section through the truck frame at one of the anchoring bolts for the bearing block.

Having reference to the drawings in detail, for an exemplification of the invention, the two sides of the truck frame are indicated at 11, 12, these being conventionally formed of channel beams. The motor is indicated generally at 13, disposed between the members of the truck frame and having one end suspended by means of a stirrup yoke 14 as is not uncommon, while the other end is supported on one or both sides by the motor suspension forming the substance of the present invention and indicated generally in Fig. 1 at 15.

The motor suspension comprises, in the present embodiment, two bearing members arranged to be fixedly mounted respectively upon the motor frame and the truck frame. The former, numbered 16, has formed thereon a laterally extending trunnion 17, taper-bored at 18 axially thereof and is anchored to the motor frame 13 by means of a correspondingly tapered bolt 19 with which a nut 20 coöperates, the same being provided with a locking cotter pin 21 where found to be desirable, the nut 20 being castellated for the purpose. The other bearing member is advantageously formed in two parts 22 and 22$^a$ arranged to be assembled and there held in position by means of bolts 23 having coöperating castellated nuts 24. The bearing block 22—22$^a$ is arranged to be seated within the channel of the truck frame, the part 22$^a$ being rigidly secured to the web of the channel by means of the bolts 25, the nuts 26 of which are similarly secured against becoming loose by means of cotter pins. The two bearing block parts 22 and 22$^a$ are semi-cylindrically cored to provide in the assembled parts a bore 27 for the accommodation of the trunnion 17, forming a journal bearing therefor. An oil duct leading to the bore of the parts 22—22$^a$ is provided having a suitable closure cap 28, by which means the bearing of the trunnion in the bore may be lubricated.

The distance separating the exterior faces of the bearing blocks 16 on the two sides of the motor, where two are employed, is sufficiently less than the distance separating the inner opposed faces of the truck frame to provide for slight play. This enables the trunnions 17 to move in an axial direction within the bores 27 of the bearing blocks as well as to move angularly therein. Where but one motor suspension is employed, the motor casing being directly connected to the truck frame at the opposite side, a similar allowance is made for axial play of the trunnion within its bearing.

From the foregoing, it will be readily understood that where the members of the truck frame yield in use toward and from each other, such yielding is neutralized in so far as the motor is concerned by the axial movement of the trunnion 17 in the bore 27; and where there is a torsional yielding of the two sides of the truck frame into and out of a common horizontal plane, such strains are not transmitted to the motor,—this by reason of the angular movement permitted between the trunnion and its bearing. In this way the motor is practically insulated from the frame in so far as concerns any participation by the motor in the give and take of the truck frame, thus obviating the disadvantageous results hitherto pointed out.

I claim:

1. The combination with a motor, and a supporting frame, of a motor suspension comprising a bearing block having a laterally extending trunnion bored axially thereof, a bolt seated therein and anchoring the block to the motor, a second bearing block having a lateral bore to receive the trunnion, and means anchoring the second block to the frame, the trunnion axially and angularly movable within its bearing in the second block.

2. The combination with a motor, and a supporting frame of channel section, of a motor suspension comprising a bearing block having a laterally extending trunnion taper bored axially thereof, a taper bolt seated therein and anchoring the block to the motor, a second bearing block seated within the channel of the frame and having a lateral bore to receive the trunnion as a bearing therefor, bolts anchoring the second block to the web of the channel, the trunnion axially and angularly movable within its bearing.

3. The combination with a motor, and a supporting frame of channel section, of a motor suspension comprising a bearing block having a laterally extending trunnion taper bored axially thereof, a taper bolt seated therein and anchoring the block to the motor, a second bearing block seated within the channel of the frame and having a lateral bore to receive the trunnion as a bearing therefor, bolts anchoring the second block to the web of the channel, the trunnion axially and angularly movable within its bearing, and an oil duct leading to the bore for lubricating the trunnion within its bearing.

In testimony whereof I have hereunto signed my name in the presence of two subscribing witnesses.

CARL L. PEARSON.

Witnesses:
I. J. CUSHING,
F. P. LAUTH.